(12) United States Patent
Reith et al.

(10) Patent No.: US 7,419,622 B2
(45) Date of Patent: Sep. 2, 2008

(54) STABILIZER COMPOSITION FOR HALOGEN-CONTAINING THERMOPLASTIC RESIN COMPOSITIONS

(75) Inventors: Walter Reith, Egenhofen (DE); Michael Rosenthal, München (DE)

(73) Assignee: Barlocher GmbH, Unterschleissheim (DE)

( * ) Notice: Subject to any disclaimer, the term of this patent is extended or adjusted under 35 U.S.C. 154(b) by 42 days.

(21) Appl. No.: 10/456,020

(22) Filed: Jun. 6, 2003

(65) Prior Publication Data

US 2003/0209696 A1 Nov. 13, 2003

Related U.S. Application Data

(63) Continuation of application No. 09/673,950, filed as application No. PCT/EP99/02548 on Apr. 15, 1999, now abandoned.

(30) Foreign Application Priority Data

Apr. 24, 1998 (DE) ................. 198 18 441

(51) Int. Cl.
*C08K 3/00* (2006.01)
*A23L 1/00* (2006.01)

(52) U.S. Cl. ...................... 252/383; 524/401

(58) Field of Classification Search ............ 252/183.12, 252/383; 524/401
See application file for complete search history.

(56) References Cited

U.S. PATENT DOCUMENTS 5,356,981 A * 10/1994 Tsuruga et al. ............... 524/413
5,938,977 A * 8/1999 Rosenthal et al. ...... 252/400.61

FOREIGN PATENT DOCUMENTS

| EP | 838495 | * 10/1997 |
| JP | 555-9664 | 1/1980 |
| JP | 55009664 | 1/1980 |

* cited by examiner

*Primary Examiner*—Cephia D Toomer
(74) *Attorney, Agent, or Firm*—Hoffmann & Baron, LLP; Irving N. Feit

(57) ABSTRACT

The present invention relates to a stabilizer composition for halogen-containing thermoplastic resins, the stabilizer composition comprising
(a) calcium hydroxide and/or calcium oxide which may optionally be surface-modified; and
(b) a hydroxyl group-containing isocyanurate.

This stabilizer composition is particularly suited for weather-resistant halogen-containing resin compositions, such as rigid PVC.

10 Claims, No Drawings

STABILIZER COMPOSITION FOR HALOGEN-CONTAINING THERMOPLASTIC RESIN COMPOSITIONS

This application is a continuation of pending U.S. application Ser. No. 09/673,950, filed on Dec. 29, 2000 now abandoned, which is a §371 national stage application of international PCT Application No. PCT/EP99/02548 filed on Apr. 15, 1998. This application asserts priority of German Application Serial No. DE 198 18 441.7 filed on Apr. 24, 1998. The entire specifications of U.S. application Ser. No. 09/673,950, international PCT Application No. PCT/EP99/02548 and German Application Serial No. DE 198 18 441.7 are hereby incorporated by reference.

The present invention relates to a stabilizer composition for weather-resistant halogen-containing thermoplastic resin compositions based, particularly, on polyvinyl chloride (PVC).

Halogen-containing polymers are subject to chemical decomposition reactions which are caused by the action of electromagnetic radiation and/or heat and which can lastingly impair characteristics regarding use or already lead to problems during processing. In particular, PVC moldings tend to decompose under the action of heat, water and electromagnetic radiation, such decomposition reactions being, above all, detrimental to the color. To prevent such undesired decomposition reactions of the polymer chains, so-called stabilizers have been integrated into the thermoplastic polymer compositions since a long time.

Stabilizers which contain heavy metals are normally used in the production of molded articles of PVC-U, for instance window sections, technical sections, pipes and plates, because of the high demands which are made on these molded articles, and on account of their good stabilizing characteristics. Since heavy metals, such as lead or cadmium, are under discussion for the stabilization of PVC for reasons of industrial hygiene and for environmental reasons, attempts have been made to replace said stabilizers more and more by physiologically harmless stabilizing systems based on calcium or zinc compounds. These stabilizers, however, mostly impart a considerably reduced thermostability to the molded articles stabilized thereby and often show a tendency towards a conspicuous yellow staining when exposed to outdoor weather for a long period of time.

Therefore, the known Ca/Zn stabilizer systems are not adequate, in particular, for white molded parts of PVC-U for outdoor applications, for instance PVC window sections, with respect to thermostability and weather resistance.

According to the teaching imparted in EP-B-424572, the weather resistance of lead- and cadmium-stabilized PVC-U molded bodies is improved by the partial replacement of titanium dioxide by zinc sulfide. However, the content of heavy metals in the PVC-U molding compound is increased by the use of such a combination, which is not desired with respect to the new stabilizing systems.

Moreover, DE-C-3019632 discloses the use of hydrotalcites represented by the formula $Mg_{1-x}Al_x(OH)_2 A_{x/n}{}^{n-}\cdot mH_2O$ for inhibiting the decomposition of thermoplastic resins. However, it has been found that the compounds listed there do not exhibit the desired quality with respect to thermal stability.

Other stabilizer compositions of the hydrotalcite type, for instance those described in EP-B-189899 as $[(M_1{}^{2+})_{y1}(M_2{}^{2+})_{y2}]_{1-x}M_x{}^{3+}(OH)_2A_{x/n}{}^{n-}\cdot mH_2O$, satisfy the high demands made on thermostability either not at all or only insufficiently.

Calcium hydroxide as a stabilizer for PVC is described in DE-A-2935689 where the field of application is PVC-P and at least one phenolic antioxidant is imperative. The combination of overbased alkaline earth carboxylates with zeolite, calcium hydroxide and perchlorates is known from EP-B-0 394 547. However, the combination described therein is only suited for use in PVC-P for indoor applications. This is also applicable to DE 4031 401 A1. DD-A-298 799 suggests the use of a combination of various, finely dispersed calcium compounds, which are coated with calcium stearate, as PVC stabilizers.

It is the object of the present invention to provide a stabilizer composition for halogen-containing thermoplastic resins which in comparison with known formulations exhibits a high thermostability and which is preferably suited for use in PVC-U for outdoor applications.

This object is achieved according to the invention by a stabilizer composition for halogen-containing thermoplastic resins, the stabilizer composition comprising
(a) calcium hydroxide and/or calcium oxide which may optionally be surface-modified; and
(b) a hydroxyl group-containing isocyanurate.

According to the invention component (a) is preferably contained in an amount of 0.1 to 5 parts by weight, in particular in an amount of 0.2 to 2 parts by weight, based on the halogen-containing resin.

According to the invention component (b) is preferably contained in an amount of 0.1 to 3 parts by weight, in particular in an amount of 0.2 to 1 part by weight, based on the halogen-containing resin.

The hydroxyl group-containing isocyanurate is preferably selected from compounds represented by the general formula (I)

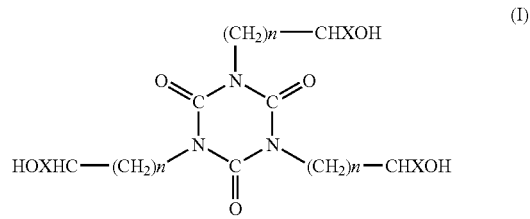

wherein groups X and indices n are respectively the same or different and n is an integer of 0 to 5 and X is a hydrogen atom or a straight-chain or branched alkyl group having 1 to 6 carbon atoms.

Particularly preferred is tris(hydroxyethyl)isocyanurate (hereinafter called THEIC).

The stabilizer composition according to the invention is preferably used for polyvinyl chloride (PVC) as the halogen-containing thermoplastic resin. It is particularly preferred for PVC-U (rigid PVC).

The term polyvinyl chloride as used in the present invention covers standard homopolymers or copolymyers of vinyl chloride and also mixtures of such polyvinyl chloride compounds with other polymer compositions. Such polymers may have been produced in any desired way, for instance by suspension, emulsion or block polymerization. Their K value may, for instance, range between 50 and 100.

It has been found that the use of a stabilizer composition according to the invention permits, in particular, the production of molded bodies of PVC-U for outdoor applications, the molded bodies exhibiting an unexpectedly high thermostability.

In addition, the stabilizer composition according to the invention may contain at least one further component. This component can e.g. be selected from the following substances:

Basic calcium-aluminum-hydroxy-phoshites represented by the general formula (II)

$$Ca_xAl_2(OH)_{2(x+3-y)}(HPO_3)_y \cdot m\ H_2O \quad (II)$$

wherein $2 \leq x \leq 12$, $\frac{2x+5}{2} > y > 0$, and $0 \leq m \leq 12$.

Compounds represented by the general formula (II) are e.g. described in DE-A-4106411. Further basic calcium-aluminum hydroxy-phosphites are described in DE-A-3941902.

Basic calcium-aluminum-hydroxy-carboxylates represented by the general formula (III)

$$Ca_xAl_2(OH)_{[(2x+6)-y]}A_{y/n}{}^{n-} \cdot m\ H_2O \quad (III)$$

wherein $2 \leq x \leq 12$ $\frac{2x+5}{2} > y > 0$ $0 \leq m \leq 12$, and $1 \leq n \leq 8$, and $A^{n-}$ is an aliphatic saturated, unsaturated, straight-chain or branched mono- or polyfunctional carboxylic acid anion having 1 to 22 carbon atoms or an aromatic or heteroaromatic mono- or polyfunctional carboxylic acid anion having 6 to 20 carbon atoms.

The carboxylic acid anion $A^{n-}$ represented by the general formula (III) can, for instance, be selected from anions of malonic acid, succinic acid, adipic acid, fumaric acid, maleic acid, phthalic acid, isophthalic acid, terephthalic acid, pyridinic acid, benzoic acid, salicylic acid, tartronic acid, malic acid, tartaric acid, acetonedicarboxylic acid, oxalacetic acid, aconitic acid and citric acid. The anions of fumaric acid and phthalic acid are preferred; fumarates are particularly used.

Compounds represented by the general formula (III) are e.g. known from DE-A-4106404. Further calcium-aluminum-hydroxy-carboxylates are described in DE-A-4002988.

Polyols and/or dissaccharide alcohols, such as trimethylol propane, ditrimethylol propane, pentaerythrite, dipentaerythrite, tripentaerythrite, polyvinyl alcohol, maltite, isomaltite, sorbite, mannite, lactite, glycerol, diglycerol.

Epoxide compounds

Linear or cyclic β-ketoesters and/or β-diketones and/or triketones and/or the metal salts thereof.

Hydrotalcites as are e.g. described in DE 44 25 266, EP 01 89 899, DE 38 43 581, U.S. Pat. No. 4,883,533, EP 04 07 139, DE 40 31 818, DE 41 10 835, DE 41 17 034, EP 05 22 810, DE 44 39 934 and U.S. Pat. No. 5,352,723.

Zeolites which can e.g. be described by the general formula $M_x{}''[(AlO_2)_x(SiO_2)_y]\cdot mH_2O$, wherein n is the charge of the cation M (e.g. alkali metal or alkaline earth metal), $0.8 \leq x$; $y \leq 15$ and $0 \leq m \leq 300$.

Amino compounds, e.g. selected from sterically hindered amines (HALS), aminocrotonic acid compounds, uracils, amino acids and the alkali or alkaline earth salts thereof.

Hydrocalumites represented by the general formula $AlCa_x(OH)_2 x+3 \cdot mH_2O$; x=1 to 4, m=0 to 8, which are e.g. described in DE-A-4103881.

Alkaline earth and/or zinc salts of saturated, unsaturated, straight-chain or branched mono- or polyfunctional aromatic or aliphatic carboxylic acids.

Tin-containing stabilizers selected from mercaptides, sulfides and carboxylates. Both normal esters and reversed esters can be used.

Perchlorate compounds which can e.g. be used as salts of mono-, di- or trivalent metals which are optionally inerted, for instance by chalk or silicates, and/or as interstitial compounds in inorganic layered compounds.

Lubricants, e.g. selected from the groups consisting of paraffin waxes, polyethylene waxes, polypropylene waxes, ester lubricants, mono- and/or polyvalent alcohols, mono- and/or polycarboxylic acids and/or amide waxes.

Lubricants can e.g. be used as lubricant compositions, in accordance with rheological requirements.

The stabilizer composition according to the invention can be present in any desired physical form, for instance as a powder mixture, as pellets, spray granules or microgranules, flakes or pastilles. Granules can be formed from these product either from powder mixtures by pressure and/or temperature and/or addition of granulating aids. Alternatively, flakes, pastilles or prills can be formed by cooling or spraying of melts of the composition according to the invention. For the preparation of halogen-containing resin compositions, the individual substances may be added directly or as a mixture to the above-mentioned product forms prior to or during processing. The halogen-containing thermoplastic resin composition can then be formed into molded bodies in a manner which is known per se.

The stabilizer composition according to the invention can be used in combination with conventionally used additives, such as fillers (e.g. chalk), pigments (such as titanium dioxide, zinc sulfide), flameproofing agents (such as magnesium hydroxide, aluminum hydroxide, antimony trioxide), reinforcing agents (e.g. glass fibers, talcum, plant fibers) and plasticizers (e.g. phthalate, phosphate and/or polymer plasticizers, chlorinated paraffins) in the preparation of thermoplastic molding compositions.

The following examples which are described in formulation tables A and B will explain the invention. In the examples the thermostability was evaluated by determining the DHC value according to DIN 53381, part 1, Method B.

Processing:

The components of the formulation were mixed together with PVC and other additives in a heating/cooling mixer up to a preparation temperature of 120° C. and were subsequently cooled to 40° C. The resultant dry blend was then extruded by means of an extruder to obtain sections.

Example A (Composition)

| | A1 | A2 | A3 | A4 | A5 | A6 |
|---|---|---|---|---|---|---|
| S-PVC | 100 | 100 | 100 | 100 | 100 | 100 |
| chalk [1] | 5 | 5 | 5 | 5 | 5 | 5 |
| impact strength enhancer [2] | 7 | 7 | 7 | 7 | 7 | 7 |
| $TiO_2$ [3] | 4 | 4 | 4 | 4 | 4 | 4 |
| antiblocking agent [4] | 1 | 1 | 1 | 1 | 1 | 1 |
| distearyl phthalate | 0.6 | 0.6 | 0.6 | 0.6 | 0.6 | 0.6 |
| paraffin wax | 0.2 | 0.2 | 0.2 | 0.2 | 0.2 | 0.2 |
| benzoyl stearoyl methane | 0.2 | 0.2 | 0.2 | 0.2 | 0.2 | 0.2 |
| calcium acetyl acetonate | 0.3 | 0.3 | 0.3 | 0.3 | 0.3 | 0.3 |
| zinc stearate | 0.8 | 0.8 | 0.8 | 0.8 | 0.8 | 0.8 |
| hydrotalcite [5] | 1 | 0.5 | | 0.5 | | 0.33 |
| $Ca_4Al_2(OH)_{12}HPO_3 \cdot 3 H_2O$ | | 0.5 | 1 | | 0.5 | 0.33 |
| calcium hydroxide | | | | 0.5 | 0.5 | 0.33 |
| THEIC [6] | 0.3 | 0.3 | 0.3 | 0.3 | 0.3 | 0.3 |

[1] Hydrocarb 95 T (trade name of Omya)
[2] Bärodur E-ST 3 (trade name of Bälocher)
[3] Kronos 2220 (trade name of Kronos)
[4] Bärorapid 10 F (trade name of Bärlocher)
[5] Alcamizer 4 (trade name of Kyowa)
[6] tris-(2-hydroxyethyl)isocyanurate Table 1 shows the DHC values.

TABLE 1

| Sample | DHC value [min] |
|---|---|
| A1 | 26 |
| A2 | 25 |
| A3 | 25 |
| A4 | 66 |
| A5 | 66 |
| A6 | 61 |

It is obvious that mixtures A4 to A6 according to the invention yield considerably higher DNC values and thus exhibit a higher themostability than the comparative mixtures A1 to A3.

Table 2 shows the DHC values.

TABLE 2

| Sample | DHC value [min] |
|---|---|
| B1 | 20 |
| B2 | 27 |
| B3 | 50 |
| B4 | 74 |
| B5 | 98 |
| B6 | 138 |
| B7 | 55 |
| B8 | 70 |
| B9 | 94 |

It is obvious that mixtures B4 to B9 according to the invention yield higher values and thus exhibit a higher thermostability than the comparative mixtures B1 to B3.

The invention claimed is:

1. A stabilized halogen-containing thermoplastic resin composition, comprising:
    a) a halogen-containing thermoplastic resin;
    b) calcium hydroxide, calcium oxide or combination thereof, wherein the calcium hydroxide, calcium oxide or combination thereof is contained in an amount of 0.1 to 5 parts by weight, based on the halogen containing thermoplastic resin;
    c) tris(hydroxyethyl)isocyanurate (THEIC), wherein THEIC is contained in an amount of 0.1 to 1 parts by weight, based on the halogen-containing thermoplastic resin; and
    d) β-ketoesters, β-diketones, triketones, or the metal salts thereof.

2. The stabilized halogen-containing thermoplastic resin composition according to claim 1, wherein the calcium hydroxide, calcium oxide or combination thereof is contained in an amount of 0.1 to 2 parts by weight, based on the halogen-containing thermoplastic resin.

3. The stabilized halogen-containing thermoplastic resin composition according to claim 1, wherein said halogen-containing thermoplastic-resin composition is a polyvinyl chloride resin.

4. The stabilized halogen-containing thermoplastic resin composition according to claim 2, wherein said halogen-containing thermoplastic-resin composition is a polyvinyl chloride resin.

5. A stabilizer composition for halogen-containing thermoplastic resins, comprising:

Example B (Composition)

| | B1 | B2 | B3 | B4 | B5 | B6 | B7 | B8 | B9 |
|---|---|---|---|---|---|---|---|---|---|
| S-PVC | 100 | 100 | 100 | 100 | 100 | 100 | 100 | 100 | 100 |
| chalk [1] | 4 | 4 | 4 | 4 | 4 | 4 | 4 | 4 | 4 |
| impact strength enhancer [2] | 7 | 7 | 7 | 7 | 7 | 7 | 7 | 7 | 7 |
| $TiO_2$ [3] | 4 | 4 | 4 | 4 | 4 | 4 | 4 | 4 | 4 |
| antiblocking agent [4] | 1 | 1 | 1 | 1 | 1 | 1 | 1 | 1 | 1 |
| stearyl stearate | 0.8 | 0.8 | 0.8 | 0.8 | 0.8 | 0.8 | 0.8 | 0.8 | 0.8 |
| paraffin wax | 0.2 | 0.2 | 0.2 | 0.2 | 0.2 | 0.2 | 0.2 | 0.2 | 0.2 |
| benzoyl stearoyl methane | 0.2 | 0.2 | 0.2 | 0.2 | 0.2 | 0.2 | 0.2 | 0.2 | 0.2 |
| calcium acetyl acetonate | 0.3 | 0.3 | 0.3 | 0.3 | 0.3 | 0.3 | 0.3 | 0.3 | 0.3 |
| zinc stearate | 0.8 | 0.8 | 0.8 | 0.8 | 0.8 | 0.8 | 0.8 | 0.8 | 0.8 |
| calcium stearate | 0.4 | 0.4 | 0.4 | 0.4 | 0.4 | 0.4 | 0.4 | 0.4 | 0.4 |
| $Ca_4Al_2(OH)_{12}HPO_3 \cdot H_2O$ | 0.8 | 1.2 | 2 | | | | 0.4 | 0.6 | 1 |
| calcium hydroxide | | | | 0.8 | 1.2 | 2 | 0.4 | 0.6 | 1 |
| THEIC [6] | 0.4 | 0.4 | 0.4 | 0.4 | 0.4 | 0.4 | 0.4 | 0.4 | 0.4 | a) calcium hydroxide;

b) tris(hydroxyethyl)isocyanurate (THEIC), wherein the weight ratio of component (a) to component (b) is 0.4:0.4, 0.33:0.3, 0.6:0.4, 0.5:0.3, 0.8:0.4, 1:0.4, 1.2:0.4, or 2:0.4; and c) β-ketoesters, β-diketones, triketones, or the metal salts thereof.

6. The stabilizer composition according to claim 5, wherein said composition is for polyvinyl chloride resins.

7. A method for stabilizing a halogen-containing thermoplastic resin comprising mixing the halogen-containing thermoplastic resin with at least a) an amount of 0.1 to 5 parts by weight of calcium hydroxide, calcium oxide or combination thereof;

b) an amount of 0.1 to 1 parts by weight of tris(hydroxyethyl)isocyanurate (THEIC), wherein the amounts given for (a) and (b) are based on the halogen-containing thermoplastic resin; and c) β-ketoesters, β-diketones, triketones, or the metal salts thereof.

8. The method according to claim 7, wherein said halogen-containing thermoplastic resin is a polyvinyl chloride resin.

9. A method for stabilizing a halogen-containing thermoplastic resin comprising mixing the halogen-containing thermoplastic resin with a stabilizer composition, wherein the stabilizer composition comprises:

a) calcium hydroxide;

b) tris(hydroethyl)isocyanurate (THEIC), wherein the weight ratio of component (a) to component (b) is 0.4:0.4, 0.33:0.3, 0.6:0.4, 0.5:0.3, 0.8:0.4, 1:0.4, 1.2:0.4, or 2:0.4; and c) β-ketoesters, β-diketones, triketones or the metal salts thereof.

10. The method according to claim 9, wherein said halogen-containing thermoplastic resin is a polyvinyl chloride resin.

* * * * *